United States Patent [19]

Meyerle et al.

[11] 4,428,257

[45] Jan. 31, 1984

[54] MOTOR VEHICLE CONTROL FOR AN INFINITELY VARIABLE TRANSMISSION

[75] Inventors: Michael Meyerle, Meckenbeuren; Friedrich Ehrlinger, Friedrichshafen, both of Fed. Rep. of Germany

[73] Assignee: Zahnradfabrik Friedrichshafen AG, Friedrichshafen, Fed. Rep. of Germany

[21] Appl. No.: 181,081

[22] Filed: Aug. 22, 1980

[30] Foreign Application Priority Data

Aug. 24, 1979 [DE] Fed. Rep. of Germany ....... 2934270

[51] Int. Cl.$^3$ ................. B60K 41/12; B60K 41/26
[52] U.S. Cl. .................................. 74/866; 74/865; 192/4A
[58] Field of Search ................. 74/865, 866, 867; 192/4 A

[56] References Cited

U.S. PATENT DOCUMENTS

| 3,426,624 | 2/1969 | Karig et al. ............ 192/4 A X |
| 3,893,344 | 7/1975 | Dantlgraber et al. ........... 74/867 X |
| 3,913,418 | 10/1975 | Miyao et al. ............... 74/865 X |

FOREIGN PATENT DOCUMENTS

| 815455 | 10/1951 | Fed. Rep. of Germany . |
| 844863 | 7/1952 | Fed. Rep. of Germany . |
| 1228518 | 11/1966 | Fed. Rep. of Germany . |
| 1655049 | 8/1971 | Fed. Rep. of Germany . |
| 2712327 | 10/1977 | Fed. Rep. of Germany . |
| 1222323 | 2/1971 | United Kingdom . |
| 1462957 | 1/1977 | United Kingdom . |
| 1465092 | 2/1977 | United Kingdom . |
| 1523544 | 9/1978 | United Kingdom . |
| 1525861 | 9/1978 | United Kingdom . |
| 2012892 | 8/1979 | United Kingdom . |
| 2025583 | 1/1980 | United Kingdom . |
| 2033616 | 6/1980 | United Kingdom . |
| WO79/00036 | 2/1979 | PCT Int'l Appl. . |
| WO79/00781 | 10/1979 | PCT Int'l Appl. . |

Primary Examiner—Allan D. Herrmann
Attorney, Agent, or Firm—Karl F. Ross; Herbert Dubno

[57] ABSTRACT

In order to control an infinitely-variable transmission of a vehicle engine, a memory stores an optimum fuel consumption curve by which signal transmission is modified through the throttle valve control line or an adjustment regulating valve line for a servomotor connected between the accelerator pedal and the transmission whose ratio is controlled by the servomotor.

10 Claims, 4 Drawing Figures

MOTOR VEHICLE CONTROL FOR AN INFINITELY VARIABLE TRANSMISSION

FIELD OF THE INVENTION

The invention relates to an automatic control system for an infinitely variable transmission driven by an internal combustion engine, especially for motor vehicles.

BACKGROUND OF THE INVENTION

An automatic control device of an infinitely variable transmission driven by an internal combustion engine, especially for a motor vehicle, wherein an accelerator travel signal is transmitted by an accelerator pedal for the purpose of, on the one hand, adjusting the throttle valve opening and, on the other, operating a servo-adjusting device by means of which the infinitely variable transmission gear is regulated is known, for example, from the publication DE-OS No. 27 12 327. This German Patent document describes a system whereby an accelerator pedal with subsequent accelerator pedal signal transmitter produces a signal that is used, via a first store or memory, to control the throttle-valve opening. In the first store a function $F_1$ is so stored that the store transmits an output signal which serves as a measure for the opening angle of the butterfly valve of the carburettor. In addition, the accelerator output signal is transmitted to a second sotre or memory that holds a function $F_2$. The second store provides an output signal corresponding to the calculated speed of rotation of the internal combustion engine. This second store in conjunction with a comparator circuit controls a servo-adjusting device for the direct operation of the infinitely variable transmission.

This circuit of an automatic control system of an infinitely variable transmission gear driven by an internal combustion engine is extremely cumbersome. It requires two memories to ensure, on the one hand, the control of the throttle valve opening and, on the other, the control of the infinitely variable gear unit. Furthermore, it entails the risk of failure if, as a result of incorrectly stored functions in the first and second stores, optimum adaptation cannot be achieved. In such a case there would be no optimum adaptation of the control process of the servo-adjusting device to the regulation of the opening angle of the butterfly valve. As a result, the fuel consumption would rise again.

OBJECT OF THE INVENTION

The object of the present invention is therefore to eliminate the above described disadvantages and to provide an automatic control system for an infinitely variable transmission gear driven by an internal combustion engine where at each performance level of the internal combustion engine selected by the driver of the vehicle the transmission ratio to the internal combustion engine is automatically regulated so that optimum operating conditions are achieved at minimum fuel consumption.

SUMMARY OF THE INVENTION

These objects are achieved by:
(a) the provision of an engine characteristics store or memory storing an optimum consumption curve which is a function of the driving engine, and (b) mounting the engine characteristics store memory in one of two lines, namely the throttle-valve control line or the adjustment regulating line.

The servo-adjusting device can consist of a regulating valve acting as a pressure balance by means of which a servo-motor is controlled for the direct regulation of the infinitely variable gear unit whereby the regulating valve is operated in relation to a signal difference between a driving engine speed signal (c) and a control signal (b).

We can provide an electronic drive controller at the exit of which a differential signal (d), formed from the driving engine speed signal (c) and the control signal (b) (or the accelerator travel signal (a)), is given off to operate the servo-adjusting device in such a way that the set point value of the signal difference:

$(b)+(a)=(d)$=constant, and $(a)+(c)=(d)$=constant, respectively.

A differential signal (d), formed from the driving engine speed signal (c) and the control signal (b) (or the accelerator travel signal (a)), as well as a constant control factor (k), occurring at the exit of the electronic drive controller (180) for operating the servo-adjusting device are provided, in such a way that the set point value of the signal difference:

$(k)+(c)-(b)=(d)$=constant, and $(k)+(c)-(a)=(d)$=constant, respectively.

The engine characteristics store is preferably housed in the drive controller.

A braking device is provided so that a brake signal (f) is transmitted via a brake pedal or inching pedal to a balance lever which serves to restrict or return the adjustment of the regulating valve and of an adjusting piston of the servomotor.

Speed restriction is provided as a function of the gear transmission in such a way that the fulcrum of the balance lever can be swivelled by a selector lever so that, depending on the position of the adjusting piston, the swivel movement of the regulating valve toward the switch position A is restricted correspondingly.

Alternatively speed restriction is provided as a function of the driving speed in such a way that, via a driven shaft speed signal (g) and a speed restrictor, a speed restriction signal is produced which overrides the differential signal (d) when the set limits are exceeded which, via the regulating valve, restricts the adjustment of the adjusting piston of the servomotor.

Via the brake pedal or inching pedal, a braking signal (f) can be transmitted to the drive controller which overrides the differential signal (d) and restricts or returns the adjustment of the servomotor.

Moreover the engine characteristics store can be designed as a cam.

The system proposed in the invention offers particular advantages in that the transmission starting moment, or the torque of the driving engine, is always adjusted to the same level for a constant accelerator pedal position, and that the gear transmission adjusts to the changing vehicle resistances. There are therefore no control power losses e.g. due to engine compression such as are known from many other control and regulating devices. The total power of the driving engine can therefore be fully exploited within the maximum possible traction range during any state of operation and under any load situation. This facility of adaptation to the optimum engine characteristic of the driving engine offers the further advantage of each performance level of the driving engine being assigned the appropriate speed at which it operates with minimum consumption.

One advantageous embodiment of the invention features a speed restriction for machines, in particular for farm tractors. It is so designed that any desired speed restriction can be preselected. For road vehicles it is also of advantage to be able to preselect and permanently adjust the required speed limit within roads subjected to speed restrictions.

BRIEF DESCRIPTION OF THE DRAWING

Below the system the invention for the automatic control of an infinitely variable transmission driven by an internal combustion engine is explained for two embodiments with reference to the accompanying drawing in which.

SPECIFIC DESCRIPTION

Figure 1:
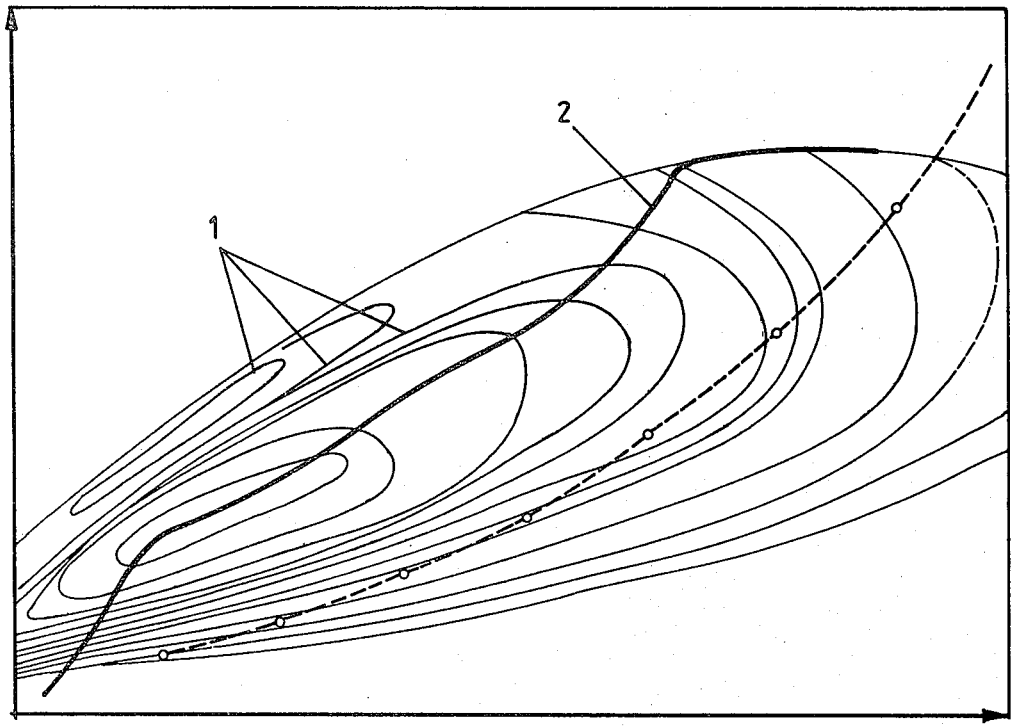
FIG. 1 shows a family of curves for an internal combustion engine with an optimum consumption curve for one relevant infinitely variable gear unit.

In the diagram according to FIG. 1 the curves 1 of constant fuel consumption are given for one internal combustion engine. The ordinate shows the performance in relation to the rotational speeds of the internal combustion engine given on the abscissa. This diagram of FIG. 1 shows an optimum consumption curve 2 for an internal combustion engine with infinitely variable gears, i.e. a curve for minimum fuel consumption at optimum rotational speed and maximum power. It is in accordance with this optimum consumption curve 2 that the automatic control device of the invention is to operate.

Figure 2:
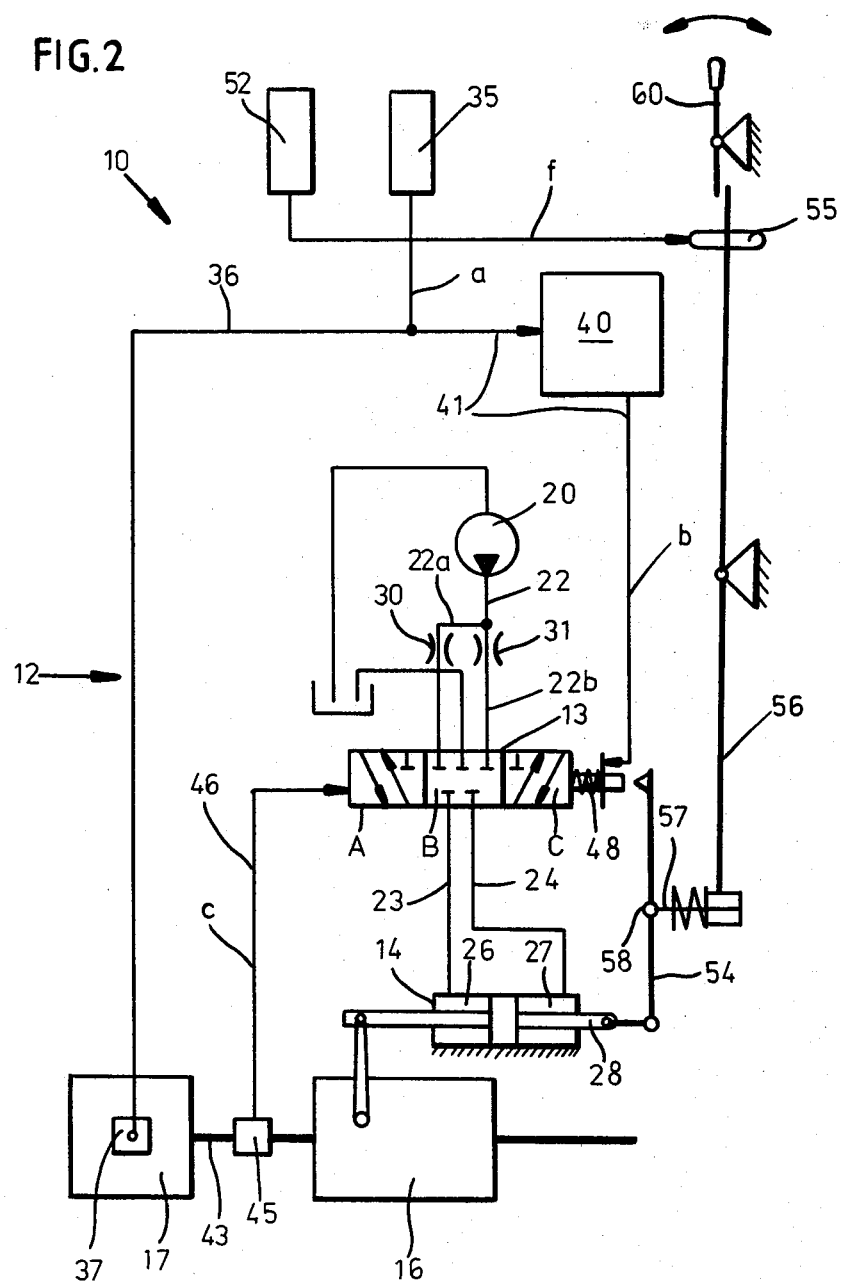
FIG. 2 is a flow diagram which shows an automatic control system of an infinitely variable gear unit with three driving ranges.

FIG. 2 shows an automatic control device 10, a servo-adjusting device 12, a regulating valve 13 acting as a pressure balance, a servo-motor 14, an infinitely variable gear or transmission 16 and a driving engine 17. The servo-adjusting device 12 comprises the regulating valve 13, a servo a 20 which transports pump medium through the pump lines 22 to the regulating valve 13 and on through two adjustment lines 23 and 24 to the two working spaces 26 and 27 of the servomotor 14. The regulating valve 13 is a 5/3 way valve, so that in position A adjustment line 23 is connected with the servo-pump 20 via the pump line 22, and in position C adjustment line 24 is connected with the servo-pump 20 via the pump line 22. In the central, neutral position B all connections of the regulating valve 13 are blocked. In order to provide for the various adjustment speeds required by different vehicles for the ratio changes of the infinitely variable gear unit 16, in both directions, the pump line 22 can be designed as a twin line 22a and 22b with separate throttles 30 and 31 for each adjustment direction in the pump lines 22a and 22b, respectively. Direct regulating of the infinitely variable gear unit 16 is effected by the servomotor 14: one of the two working spaces 26 and 27, depending on the setting of the regulating valve 13, is filled with pump medium by the servo-pump 20 via the corresponding control line 23 or 24, while the other working space is connected with a tank 33.

Depending on the position of the accelerator pedal 35, an accelerator travel signal a is produced which is transmitted through a throttle valve control line 36 to a throttle valve governor 37 for controlling the driving engine speed. The accelerator travel signal a is also transmitted via an adjustment line 41, to an engine characteristics store or memory 40 where the optimum consumption curve 1 according to FIG. 1 is stored. The engine characteristics store 40 sends a control signal b, i.e. the accelerator travel signal a, modulated in accordance with the family of curves shown in FIG. 1, to operate the regulating valve 13.

The control signal b, acting on the regulating valve 13 and produced in the engine characteristics store 40, ensures that the driving engine 17 will, during each driving situation or performance requirement, operate at a speed which produces the required power at minimum fuel consumption. The engine characteristics store 40 is provided for this purpose, for it stores the characteristics of the most favorable fuel consumption figures for the driving engine 17 employed, i.e. the optimum consumption curve 1 of FIG. 1. Another control value is the driving engine speed signal c which is produced by a tachometer 45 connected with a transmission input shaft 43 and which is transmitted through a regulating line 46 to the regulating valve 13 in such a way that it counteracts the control signal b.

FUNCTION OF THE CONTROL DEVICE

The regulating valve 13 compares the driving engine speed signal c with the control signal b and, during starting, with preselected driving direction, the force of a valve spring 48 additionally acting on the regulating valve 13 predominates so that the regulating valve 13 is initially kept in its position C. The gear transmission is therefore retained in zero position until the idling speed has been exceeded and an increasing driving engine speed signal c exceeds the counterforce of the valve spring 48.

If the driving engine speed signal c is stronger than the control signal b, the regulating valve 13 is switched to position A and the servo-motor 14 effects a gear ratio change of the infinitely variable gear unit 16 toward higher output speeds. If the control signal b receives a higher value than the driving engine speed signal c, the regulating valve 13 switches to switch position C to effect a gear ratio change of the infinitely variable gear unit 16 toward lower driving speeds and the vehicle slows down. When both signals have the same value, function B of the regulating valve 13 comes into effect and no gear ratio change takes place.

The position of the regulating valve 13 and with it the gear transmission are automatically varied until the driving engine speed signal c and the control signal b are in equilibrium. Consequently each position of the accelerator pedal 35 is assigned a certain driving engine speed for the appropriate load. Once the accelerator pedal 35 has been adjusted, the ratio of the gear unit 16 will automatically adjust to a certain value. If, for example, there is an increasing uphill climb, the driving engine speed is initially decreased in order to increase the traction. As a result, the driving engine speed signal a is reduced and, while the accelerator pedal position and thus the accelerator travel signal a, or the control signal b, remain unchanged, the regulating valve 13 moves to position C whereupon a gear ratio change of the infinitely variable gear unit 16 toward lower output speeds is effected via the servomotor 14 until the driving engine speed signal c regains its original value and an equilibrium with the control signal b is reestablished.

Conversely, an increasing descent leads to a higher driving engine speed signal c and, due to the lower vehicle resistance, a higher gear transmission ratio is effected by the regulating valve 13 until the driving engine speed signal c regains its original value. With the accelerator pedal remaining in the same position, the torque of the driving engine 17 is therefore adjusted to a constant value and the ratio of the infinitely variable gear unit 16 is adapted to changing vehicle resistances. Loss of power due to engine compression is thus avoided.

During acceleration, the increasing control signal b, which is determined by the engine characteristics memory 40 in accordance with the position of the accelerator pedal 35, occurs immediately at the regulating valve 13 causing this to tip straight away into the switch position C thus effecting a reset of the gear ratio. This means that the driving torque is immediately reduced so that the driving engine 17 rapidly reaches a high speed and thus a high performance. The driving engine speed signal c quickly assumes a value that initially is even higher than the already raised control signal b so that the regulating valve 13 moves to position A and changes the gear ratio in the opposite direction until the load conditions, via the driven shaft 50, and the gear ratio have given the driving torque a value at which the driving engine speed signal c and the control signal b are in equilibrium. During the acceleration phase, therefore, the ratio in the gear unit is initially set back and, as soon as the driving engine 17 has reached the required performance, the ratio is changed in the opposite direction until the desired driving situation corresponding with the accelerator pedal position has been achieved.

When controlling the infinitely variable gear unit 16 according to FIG. 2, the vehicle brake can also be replaced to a certain degree. This is effected by overriding the control signal b by means of a brake pedal or inching pedal 52. Between the regulating valve 13 and the adjusting piston 28 operating as a function of the gear ratio, a coupler link is provided for the braking facility in the form of a balance lever 54 which is affected by the braking signal f. This braking signal f can be transferred directly to the balance lever 54 by the brake pedal 52 and via the transmitting elements 55, 56 and 57. Adjustment of the balance lever 54 can also be effected in a hydraulic, pneumatic or electric manner whereby the fulcrum 58 of the balance lever 54 is moved along.

When operating the brake pedal or inching pedal 52, the adjusting piston 28 initially remains stationary, while the coupler link, i.e. the balance lever 54, moves the regulating valve 13 to position C as a result of which the adjusting piston 28 of the servomotor 14 is swivelled toward a lower ratio of the infinitely variable gear unit 16. Adjustment continues until the forces acting upon the regulating valve 13 via the balance lever 54 and the control signal b are in equilibrium with the rising driving engine speed signal c, and until the adjusting piston 28 has been swung back far enough for the balance lever 54 to permit the regulating valve 13 to return again to its central neutral position B.

At the same time it is possible to preselect a maximum speed via a selector lever 60 which also acts on the coupler link, i.e. the balance lever 54. If the selector lever 60 in FIG. 2 is turned anticlockwise to a certain position, the adjusting piston 28 or the servomotor 25 is restricted in its stroke until the balance lever 54 moves the regulating valve 13 to its central position C at which position the infinitely variable gear unit 16 has been assigned a maximum critical transmission ratio.

Figure 3:
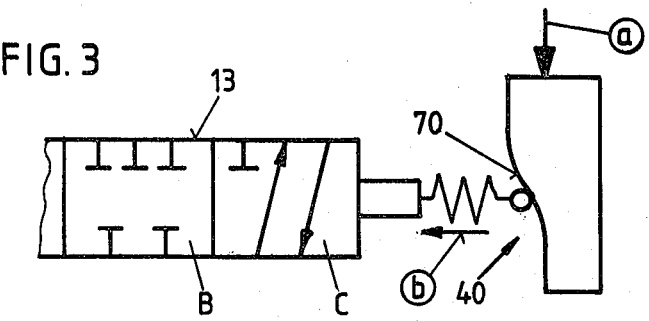
FIG. 3 is a diagrammatic elevational view which shows an engine characteristics store.

The engine characteristics store 40 of the automatic control device 10 in the embodiment of FIG. 2 can be designed e.g. as programmable read-only memory (PROM). It is also possible to design the engine characteristics store 40 as a cam 70, as shown in FIG. 3. Via this cam 70, an accelerator travel signal a is modified into the control signal b which acts upon the regulating valve 13.

Figure 4:
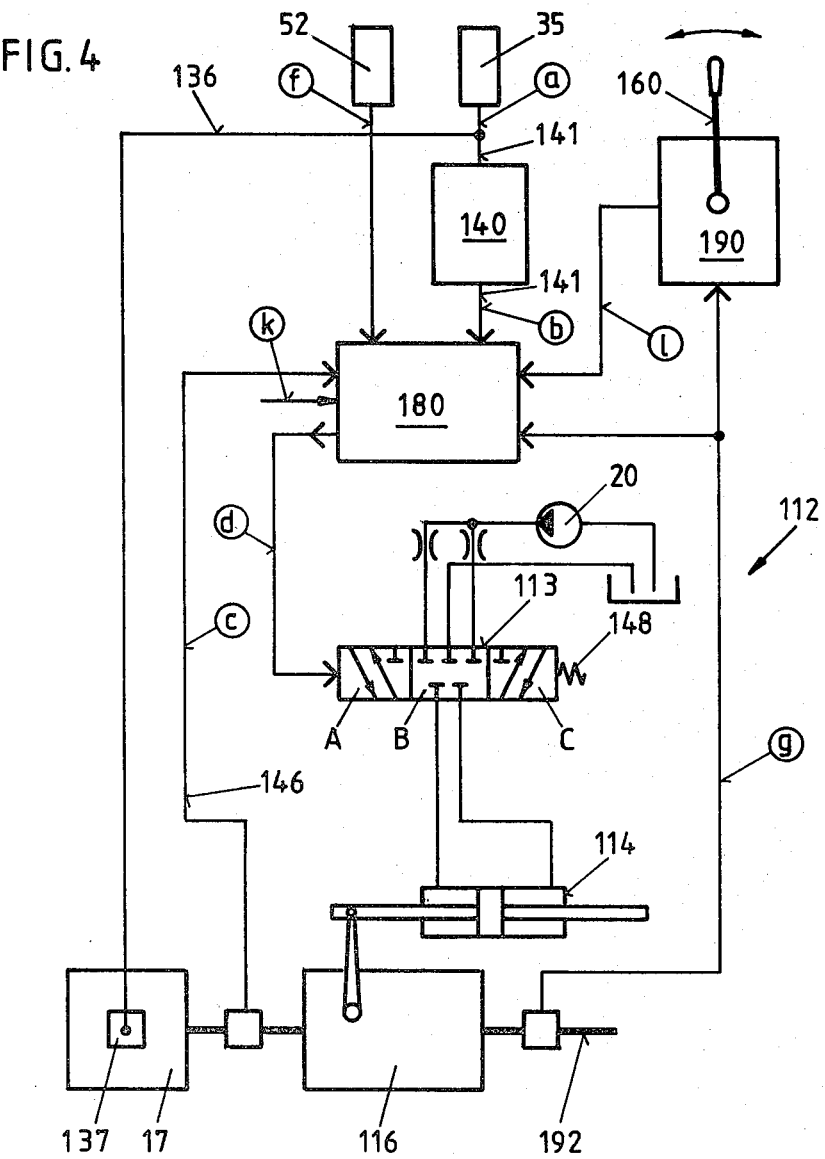
FIG. 4 is a view similar to FIG. 2 which shows a second embodiment.

FIG. 4 shows an automatic control device that differs from the configuration of FIG. 2 by a preferably electronic drive controller 180 which may also incorporate the engine characteristics store 140. The regulating valve 113 is controlled by a derivative control signal d acting against the force of a valve spring 148. The control signal b and the driving engine speed signal c are compared in this drive controller 180 and the difference is added to a constant control factor k. If the derivative control signal d equals the constant control factor k, i.e. when the set point of the signal difference is reached, function B of the regulating valve 113 comes into force and no transmission change takes place. If, on the other hand, the derivative control signal d is higher, resulting from the positive difference between the signal values of the driving engine speed signal c and the control signal b, function A of the regulating valve 113 comes into effect and the gear transmission ratio is changed toward a higher output speed. If the derivative control signal d is lower than the constant control factor k, i.e. if there is a negative difference between the signal values of the control signal b and the driving engine speed signal c, the regulating valve 113 is switched to function C which leads to a transmission ratio change toward lower output speeds.

It is also possible to form the derivative control signal d solely from the control signal b and the driving engine speed signal c, without the constant control factor k. The signal values are then determined by the fact that the constant set point of the signal difference, at which function B of the regulating valve 113 comes into force, equals the sum of b +C. This can be achieved, for example, if with an increasing driving engine speed signal c, the accelerator travel signal a is reduced from a maximum to a minimum value, while the accelerator pedal remains fully depressed.

The invention also provides for an electronic speed restrictor 190. An output speed signal g is transmitted by the driven shaft 192 to the speed restrictor 190, and by means of a selector lever 160, the maximum speed can be adjusted via this speed restrictor 190 which sends a speed restriction signal l to the electronig drive controller 180 so that, upon reaching the speed limit, the electronic drive controller is influenced in such a way that the regulating valve 113, via its functions A, B and C, constantly assigns to the infinitely variable gear unit 116 a transmission ratio that corresponds with the predetermined constant driving speed.

Via the brake pedal or inching pedal 52, the derivative control signal d is so influenced by the brake signal f, in a similar way as the speed restriction signal l, that its value falls below the set point limit of the constant control factor k until the appropriate ratio reset required for braking the vehicle has been effected.

As a modification of this embodiment it is of course possible to incorporate the engine characteristics store 140 as an integral component in the electronic drive controller 180.

Another configuration of the invention permits the engine characteristics store 40 in FIG. 2 to be fitted not in the adjustment regulating line 41 but in the throttle valve control line 36. The same applies to the embodiment of the invention shown in FIG. 4 where the engine charcteristics store 140 can be fitted, instead of in the adustment regulating line 141, in the throttle valve control line 136. In either embodiment of the invention the accelerator travel signal a acts directly on the regulating valve 13, or on the drive controller 180, whilst a converted accelerator travel signal a, that is a function of the engine characteristics, is transmitted to the throttle valve governor 37, or 137 respectively, by the engine characteristics store 40 or 140, respectively.

We claim:

1. An automatic control system for an infinitely variable transmission driven by an internal combustion engine of a motor vehicle having an accelerator pedal for controlling an accelerator having a throttle valve of said engine, said system comprising;
    means for generating an accelerator travel signal representing the displacement of said accelerator;
    a servo-adjusting device connected between said accelerator pedal and said transmission for controlling the ratio selection thereof, said servo-adjusting device including:
    a servo-valve provided with an adjustment regulating line acting on said valve in one direction and means responsive to engine speed for acting on said valve in another direction,
    a servomotor in fluid connection with said valve and connected to said transmission for changing the ratio thereof in response to operation of said valve, and
    means mechanically coupling said valve with said servomotor for readjusting the position of said valve in response to the displacement of said servomotor;
    a throttle valve control line operatively connecting said accelerator pedal with said accelerator for the delivery of said signal thereto; and
    an engine-characteristic store storing an optimum fuel consumption curve which is a function of said engine connected in one of said lines for modifying a signal transmitted therethrough in accordance with said optimum consumption curve.

2. The system defined in claim 1 wherein said valve responds to a signal differance between an engine speed signal (c) and a control signal (b) in the form of the modified accelerator travel signal (a) derived from said engine-characteristics store.

3. The system defined in claim 2 further comprising an electronic drive controller generating a differential signal (d) from said engine speed signal (c) and one of the signals (b) and (a) for operating said valve so that the set point value of the signal difference $(b)+(a)=(d)=$constant and $(a)+(c)=(d)=$constant, respectively.

4. The system defined in claim 3 wherein said signals and a constant control factor (k) at the output of said drive controller operate the valve in such a way that the set point value of the signal difference:

$(k)+(c)-(b)=(d)=$constant, and $(k)=(c)-(a)=(d)=$constant, respectively.

5. The system defined in claim 3 wherein said engine-characteristics store is incorporated in said drive controller.

6. The system defined in claim 3 further comprising speed restricting means generating a speed restricting signal adapted to override said differential signal in controlling said valve.

7. The system defined in claim 3 further comprising a brake or inching pedal generating a brake signal (f) which is applied to said controller for overriding the differential signal (d).

8. The system defined in claim 1 wherein said engine-characteristics store is a cam.

9. An automatic control system for an infinitely variable transmission driven by an internal combustion engine of a motor vehicle having an accelerator pedal for controlling an accelerator having a throttle valve of said engine, said system comprising:
    means for generating an accelerator travel signal representing the displacement of said accelerator;
    a servo-adjusting device connected between said accelerator pedal and said transmission for controlling the ratio selection thereof, said servo-adjusting device including:
    a servo-valve provided with an adjustment regulating line acting on said valve in one direction and means responsive to engine speed for acting on said valve in another direction,
    a servomotor in fluid connection with said valve and connected to said transmission for changing the ratio thereof in response to operation of said valve, and
    means mechanically coupling said valve with said servomotor for readjusting the position of said valve in response to the displacement of said servomotor;
    a throttle valve control line operatively connecting said accelerator pedal with said accelerator for the delivery of said signal thereto;
    an engine-characteristic store storing an optimum fuel consumption curve which is a function of said engine connected in one of said lines for modifying a signal transmitted therethrough in accordance with said optimum consumption curve, said valve corresponding to a signal difference between an engine speed signal (c) and a control signal (b) in the form of the modified accelerator travel signal (a) derived from said engine-characteristics store; and
    an inching pedal generating a brake signal (f), a balance lever connecting said valve with said servomotor, and means for applying said brake signal (f) to said balance lever.

10. An automatic control system for an infinitely variable transmission driven by an internal combustion engine of a motor vehicle having an accelerator pedal for controlling an accelerator having a throttle valve of said engine, said system comprising:
    means for generating an accelerator travel signal representing the displacement of said accelerator;

a servo-adjusting device connected between said accelerator pedal and said transmission for controlling the ratio selection thereof, said servo-adjusting device including:
  a servo-valve provided with an adjustment regulating line acting on said valve in one direction and means responsive to engine speed for acting on said valve in another direction,
  a servomotor in fluid connection with said valve and connected to said transmission for changing the ratio thereof in response to operation of said valve, and
  means mechanically coupling said valve with said servomotor for readjusting the position of said valve in response to the displacement of said servomotor;
a throttle valve control line operatively connecting said accelerator pedal with said accelerator for the delivery of said signal thereto;
an engine-characteristic store storing an optimum fuel consumption curve which is a function of said engine connected in one of said lines for modifying a signal transmitted therethrough in accordance with said optimum consumption curve; and
restricting means including a speed selection lever, a balance lever connecting said valve with said servomotor and having a fulcrum and means connecting said selector lever with said fulcrum for adjusting the position thereof.

* * * * *